(12) United States Patent
Velammal et al.

(10) Patent No.: US 11,210,070 B2
(45) Date of Patent: Dec. 28, 2021

(54) SYSTEM AND A METHOD FOR AUTOMATING APPLICATION DEVELOPMENT AND DEPLOYMENT

(71) Applicant: Cognizant Technology Solutions India Pvt. Ltd., Chennai (IN)

(72) Inventors: Parasu Pillai Iyappan Velammal, Chennai (IN); Madhusudhan Venkatesan, Chennai (IN); Selvaraj Natarajan, Chennai (IN)

(73) Assignee: COGNIZANT TECHNOLOGY SOLUTIONS INDIA PVT. LTD., Chennai (IN)

(*) Notice: Subject to any disclaimer, the term of this patent is extended or adjusted under 35 U.S.C. 154(b) by 0 days.

(21) Appl. No.: 16/740,451

(22) Filed: Jan. 12, 2020

(65) Prior Publication Data
US 2021/0149648 A1 May 20, 2021

(30) Foreign Application Priority Data
Nov. 19, 2019 (IN) .............................. 201941047056

(51) Int. Cl.
| | |
|---|---|
| *G06F 9/44* | (2018.01) |
| *G06F 9/445* | (2018.01) |
| *G06F 9/455* | (2018.01) |
| *G06F 8/36* | (2018.01) |
| *G06N 20/00* | (2019.01) |
| *G06F 11/36* | (2006.01) |
| *G06F 8/60* | (2018.01) |

(52) U.S. Cl.
CPC .................. *G06F 8/36* (2013.01); *G06F 8/60* (2013.01); *G06F 11/3608* (2013.01); *G06N 20/00* (2019.01)

(58) Field of Classification Search
CPC .......... G06F 8/36; G06F 8/60; G06F 11/3608; G06N 20/00
See application file for complete search history.

(56) References Cited

U.S. PATENT DOCUMENTS

| | | |
|---|---|---|
| 9,152,402 B2 | 10/2015 | Scheidel |
| 9,250,883 B2 | 2/2016 | Deanna |
| 10,534,595 B1 * | 1/2020 | Lisuk ...................... G06F 8/433 |

(Continued)

OTHER PUBLICATIONS

Qianyu Guo, An Empirical Study towards Characterizing Deep Learning Development and Deployment across different Frameworks an Platforms, 2019. https://dl.acm.org/doi/pdf/10.1109/ASE.2019.00080 (Year: 2019).*

*Primary Examiner* — Mongbao Nguyen
(74) *Attorney, Agent, or Firm* — Cantor Colburn LLP

(57) ABSTRACT

A system and a method for automating application development and deployment is provided. An automation engine is configured to generating a computing application source code associated with a domain based on a source code template. Further, fetching a developed computing application. The computing application is developed based on the generated computing application source code. Further, deploying the developed computing application in one or more pre-defined deployment infrastructures based on a deployment template. Lastly, rectifying one or more errors associated with the development and deployment of the computing application based on pre-defined training models associated with multiple error detection and rectification conditions.

18 Claims, 3 Drawing Sheets

(56) References Cited

U.S. PATENT DOCUMENTS

| | | | |
|---|---|---|---|
| 10,614,382 B1* | 4/2020 | Wu | G06F 9/451 |
| 2008/0189679 A1* | 8/2008 | Rodriguez | G06F 8/34 |
| | | | 717/105 |
| 2014/0245262 A1 | 8/2014 | Hill | |
| 2016/0124742 A1 | 5/2016 | Rangasamy | |
| 2017/0178019 A1* | 6/2017 | Duggan | G06N 7/00 |
| 2018/0060066 A1* | 3/2018 | Rihani | G06F 8/71 |
| 2019/0138288 A1* | 5/2019 | Brealey | G06F 8/65 |
| 2019/0163547 A1* | 5/2019 | Ampabathina | H04L 67/34 |
| 2019/0294528 A1* | 9/2019 | Avisror | G06F 8/60 |
| 2020/0110693 A1* | 4/2020 | Herrin | G06N 20/00 |
| 2020/0117434 A1* | 4/2020 | Biskup | G06F 8/71 |
| 2020/0136930 A1* | 4/2020 | Szulman | G06F 9/5077 |
| 2020/0151038 A1* | 5/2020 | Lingamneni | G06F 8/31 |
| 2020/0183659 A1* | 6/2020 | Bojara | H04L 63/101 |
| 2020/0184272 A1* | 6/2020 | Zhang | G06N 20/00 |
| 2020/0218516 A1* | 7/2020 | Hari Krishnan | G06F 9/45529 |
| 2020/0310769 A1* | 10/2020 | Veljanoski | G06F 17/18 |
| 2020/0387357 A1* | 12/2020 | Mathon | G06F 9/5077 |
| 2020/0401382 A1* | 12/2020 | Briggs | G06N 5/04 |
| 2020/0410386 A1* | 12/2020 | Loving | G06F 9/541 |
| 2021/0019209 A1* | 1/2021 | Krishnaswamy | G06F 11/0751 |

* cited by examiner

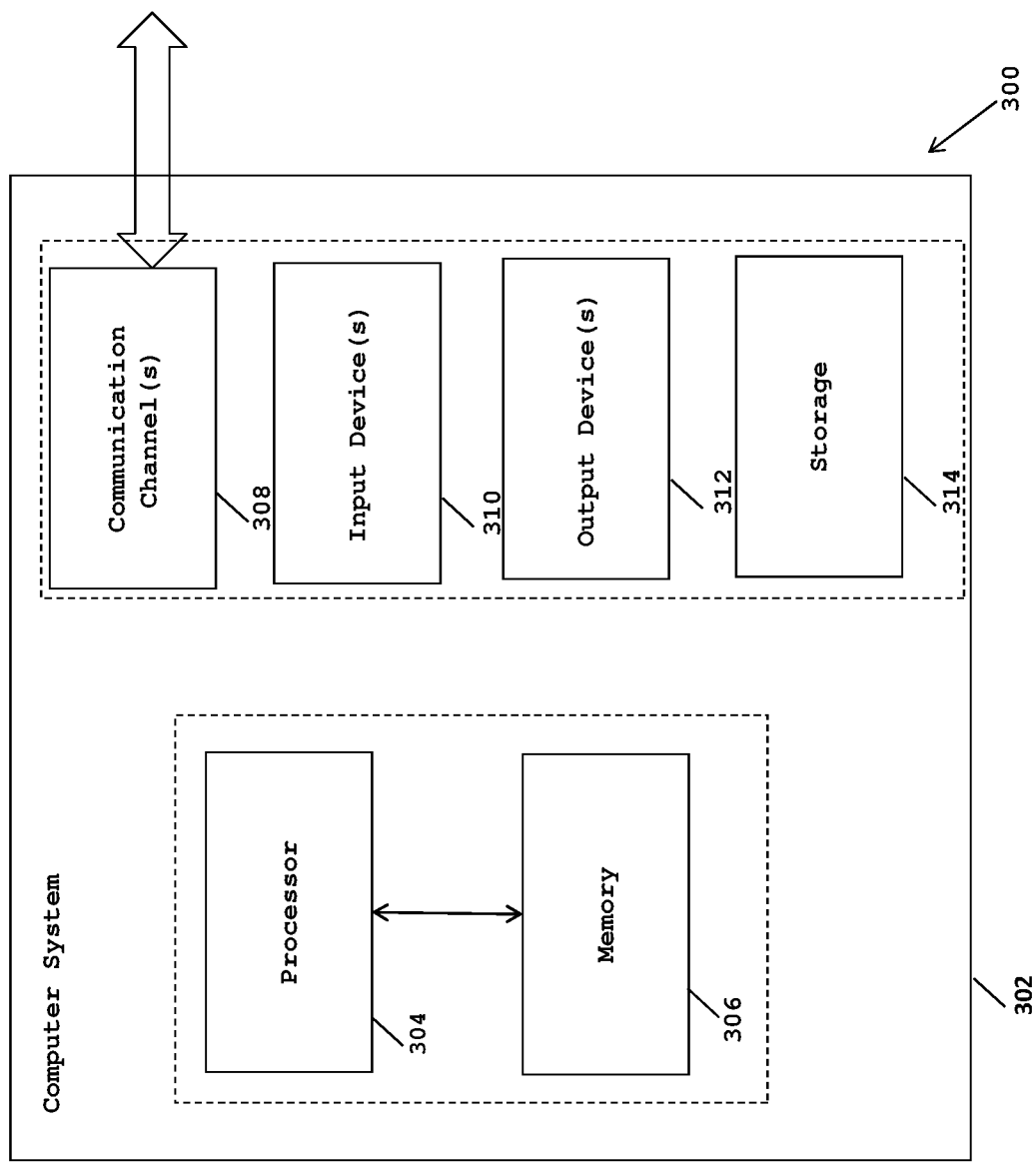

SYSTEM AND A METHOD FOR AUTOMATING APPLICATION DEVELOPMENT AND DEPLOYMENT

CROSS REFERENCE TO RELATED APPLICATION

This application is related to and claims the benefit of Indian Patent Application Number 201941047056 filed on Nov. 19, 2019, the contents of which are herein incorporated by reference in their entirety.

FIELD OF THE INVENTION

The present invention relates generally to application development and deployment. More particularly, the present invention relates to a system and a method for automating application development and deployment.

BACKGROUND OF THE INVENTION

Development and deployment of applications, services and systems utilizing a cloud native platform has recently gained a lot of popularity. The cloud native platform provides capability of building, deploying, improving and managing applications for different cloud computing environments and models. Development and deployment of applications, services and systems on cloud native platform requires high technical accuracy. Further, deployment of the cloud native applications for customer consumption has to be carried out in least time possible with minimum errors. It has been observed that the existing systems are not able to adequately provide error less deployment.

Further, the existing application development systems may develop scalable applications, however such applications may not be easily accessed. Further, the applications developed by the existing systems may have components which are not effectively specified for an industry or domain for which the application is developed. Further, the developed applications are not secure and are not able to adapt to new technologies because of their static configurations. Further, application development efforts increase and duplication of components of application occurs if developed applications are not deployed properly. Further, it has been observed that the traditional application development systems and the applications developed by such systems are hard to customize due to limited or no customizing options.

Furthermore, the traditional application development systems and developed applications usually do not comprise or depict automatic healing capabilities when any error in system or application occurs. Therefore, human intervention is required for error resolution which may increase downtime and decrease the efficiency of the system. Further, organizations or users utilizing conventional systems for development and deployment of applications are typically restricted to a particular application hosting and support infrastructures and the components of the application are not flexible for being deployed on different infrastructures or cloud environments thereby incurring huge costs.

In light of the aforementioned drawbacks, there is a need for a system and a method which provides automating application development and deployment. Further, there is a need for a system and a method which provides development and deployment of applications which are scalable. Further, there is a need for a system and a method which provides applications which have components specifically defined for an industry or domain, are secure and are able to adapt to new technologies. Further, there is a need for a system and a method which provides effective deployment of applications, reduces application development efforts and duplication of components of the application. There is a need for a system and a method which provides customizable application development platform and customizable developed application. Furthermore, there is a need for a system and a method which provides automatic healing capability, if any error(s) occurs, to the application development platform and developed and deployed application and reduces downtime. Yet further, there is a need for a system and a method which provides application development and deployment which are not restricted to a particular application hosting and support infrastructures and reduces costs.

SUMMARY OF THE INVENTION

In various embodiments of the present invention, a system for automating application development and deployment is provided. The system comprises a memory storing program instructions, a processor configured to execute instructions stored in the memory and an automation engine executed by the processor. The automation engine is configured to generate a computing application source code associated with a domain based on a source code template. Further, the automation engine is configured to fetch a developed computing application. The computing application is developed based on the generated computing application source code. Further, the automation engine is configured to deploy the developed computing application in one or more pre-defined deployment infrastructures based on a deployment template. Lastly, the automation engine is configured to rectify one or more errors associated with the development and deployment of the computing application based on pre-defined training models associated with multiple error detection and rectification conditions.

In various embodiments of the present invention, a method for automating application development and deployment is provided. The method is implemented by a processor executing instructions stored in a memory. The method comprises generating, by the processor, a computing application source code associated with a domain based on a source code template. Further, fetching, by the processor, a developed computing application. The computing application is developed based on the generated computing application source code. Further, deploying, by the processor, the developed computing application in one or more pre-defined deployment infrastructures based on a deployment template. Lastly, rectifying, by the processor, one or more errors associated with the development and deployment of the computing application based on pre-defined training models associated with multiple error detection and rectification conditions.

In various embodiments of the present invention, a computer program product is provided. The computer program product comprises a non-transitory computer-readable medium having computer-readable program code stored thereon, the computer-readable program code comprising instructions, that when executed by a processor, cause the processor to generate a computing application source code associated with a domain based on a source code template. Further, a developed computing application is fetched. The computing application is developed based on the generated computing application source code. Further, the developed computing application is deployed in one or more pre-defined deployment infrastructures based on a deployment template. Lastly, one or more errors associated with the development and deployment of the computing application are rectified based on pre-defined training models associated with multiple error detection and rectification conditions.

BRIEF DESCRIPTION OF THE ACCOMPANYING DRAWINGS

The present invention is described by way of embodiments illustrated in the accompanying drawings wherein:

FIG. 3 illustrates an exemplary computer system in which various embodiments of the present invention may be implemented.

DETAILED DESCRIPTION OF THE INVENTION

Figure 1:
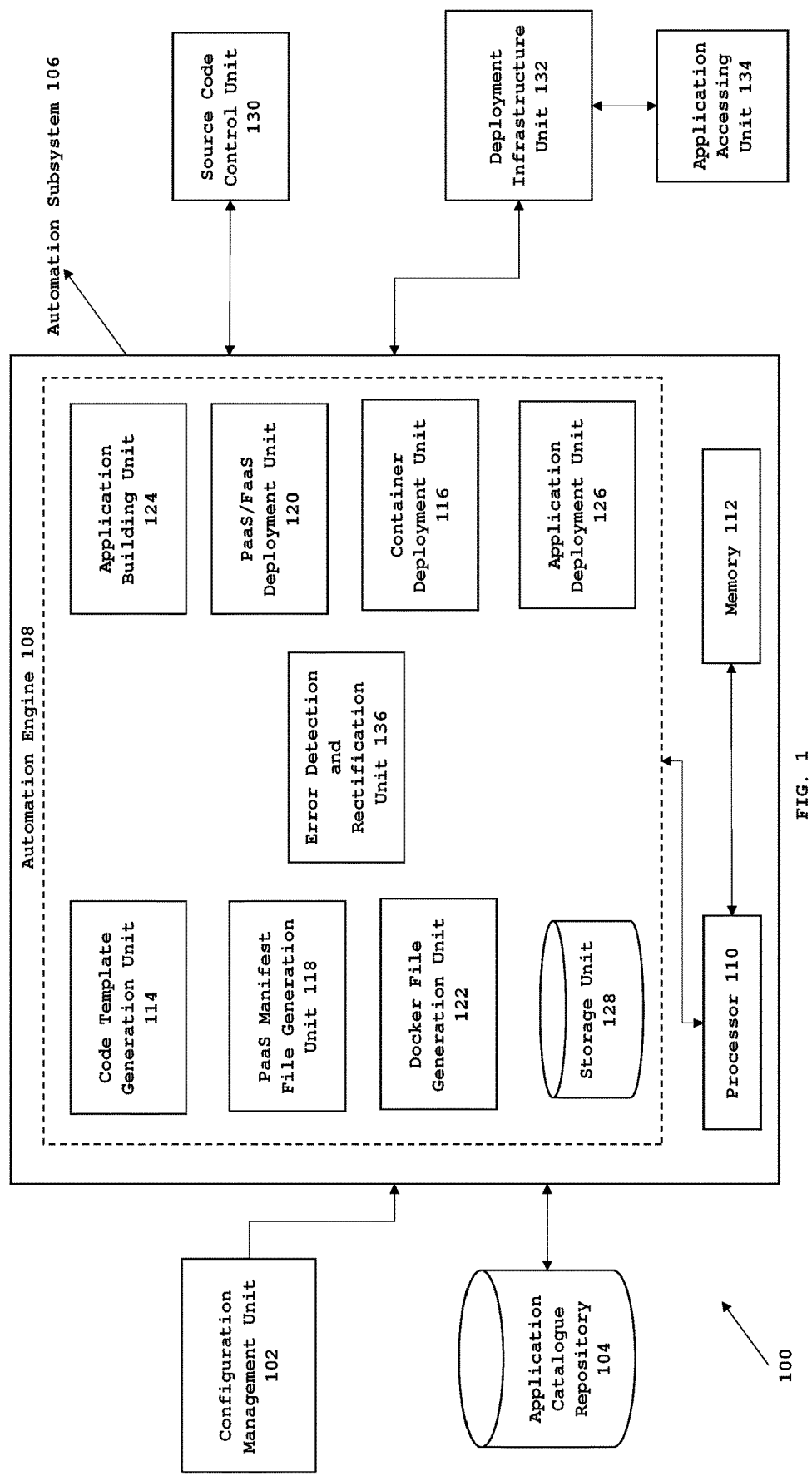
FIG. 1 is a detailed block diagram of a system for automating application development and deployment, in accordance with various embodiments of the present invention.

The present invention discloses a system and a method for automating application development and deployment. In particular, the present invention provides for application development and deployment framework based on a cloud native platform such that the framework provides capability to the users (e.g. developers, programmers etc.) for generating source code automatically, developing applications by the user using the developed source code for computing domain logic, effectively bind services and deploying the developed applications in cloud based platforms and infrastructures (e.g. platform as a service (PaaS), function as a service (FaaS), software as a service (SaaS) etc.). Further, the invention provides for a framework which develops applications which are highly scalable, secure and adaptable to new technologies with reusable capability. The invention provides for a system and a method which develops applications with dynamic interface such that the applications and components associated with the applications are capable of adapting to new technologies. The invention provides for a system and a method which aids in reducing the application development and deployment efforts and further reducing application components duplication by providing capability of deploying applications in common application deployment infrastructures, such as, private and public deployment infrastructures. The invention provides for a system and a method for customizable application development framework and customizable developed application such that the existing components are capable of being efficiently modified when technology changes, new components may be added and obsolete components may be removed from framework and applications, with reduced or no downtime. Further, the framework and application are capable of being utilized by other users as per their requirements. Further, the invention provides for a system and a method which has built-in capability of learning the error scenarios for self-healing and troubleshooting, in any scenario of unexpected error occurrence, thereby reducing downtime and human intervention. Furthermore, the invention provides for a system and a method for application development in microservices based architecture, such that the infrastructure in which the applications are deployed is capable of handling large volumes of user requests.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a detailed block diagram of a system 100 for automating application development and deployment. Referring to FIG. 1, in an embodiment of the present invention, the system 100 comprises a configuration management unit 102, an application catalogue repository 104, an automation subsystem 106, a source code control unit 130, a deployment infrastructure unit 132 and an application accessing unit 134.

In an embodiment of the present invention, the automation subsystem 106 may be deployed in a cloud computing architecture in which data, applications, services, and other resources are stored and delivered through shared datacenters.

In another embodiment of the present invention, the automation subsystem 106 may be implemented as a client-server architecture. In this embodiment of the present invention, a client terminal (not shown) accesses a server hosting the subsystem 106 over a communication network. The client terminals (not shown) may include but are not limited to a smart phone, a computer, a tablet, a microcomputer, a laptop or any other wired or wireless terminal. The server may be a centralized or a decentralized server.

In an embodiment of the present invention, the configuration management unit 102 operates in conjunction with one or more client terminals (not shown) and is configured to provide an interface via the client terminals (not shown) for selecting and carrying out the respective functionalities for development and deployment of applications. Further, multiple client terminals (not shown) may be connected to the configuration management unit 102 across various domains, industries and computing infrastructures or architectures. The interface provided by the configuration management unit 102 provides a data interchange capability between the user (e.g. developer, programmer), connected to the client terminal (not shown) and the automation subsystem 106. The interface provided by the configuration management unit 102 may include, but is not limited to, graphical user interface (GUI), a JavaScript Object Notation (JSON) interface etc. in a wizard form through which multiple options in the form of questions are provided to the users for acquiring application generation and deployment information by the automation subsystem 106. The interface is accessed by the user at the client terminal (not shown) end. The user accessing the interface provided by the configuration management unit 102 may have different application development and deployment requirements such as, but are not limited to, a new application development and deployment, deployment of an existing application etc. Further, different requirements may be associated with the application which is to be developed and deployed. The different requirements may include, but are not limited to, domain or industry to which the application may relate, deployment infrastructure platforms (e.g. PaaS, FaaS, etc.), computer programming language for developing the application source code, building application utilizing micro-service architecture, features required in the application, application development specific to a server operating system (e.g. Windows Server, Windows Nano Server, Linux, Ubuntu, Fedora, CentOS) etc.

In an embodiment of the present invention, the configuration management unit 102 may be invoked by the user (e.g. developer, programmer etc.) connected to the client terminal (not shown) in order to provide inputs which are utilized for developing and generating one or more applications source code and applications and deploying the developed and generated applications. The configuration management unit 102, upon invocation, provides multiple application source code and application development and deployment options via the interface in the form of a wizard comprising questions, to which the user may provide inputs. Further, the user inputs are representative of the computing application source code and application generation requirements based on the development and deployment options. The application source code and application generation requirements may include, but are not limited to, application source code repository and source path, application source code credentials, selecting deployment architecture option, target deployment environment (e.g. Microsoft Azure, amazon web services (AWS), Pivotal Cloud Foundry (PCF) etc.), docker requirement, application database details, application implementation details (e.g. on-premises, software as a service (SaaS) etc.), details of the dependent applications, dependent applications to bind, access credentials for exporting application data, code coverage, end-to-end testing of applications, application security scanning options etc. For example, a user in order to develop an application relating to banking and finance service (BFS) may select the programming language for source code generation (e.g. Java, C++, C, Python etc.), select option for micro-services architecture requirement or a general monolithic application architecture, selection option for providing services which are to be associated with the source code, selecting option for binding existing application services with new application services, selecting the target deployment environment etc.

Further, the inputs provided by the user for application development are communicated to the automation subsystem 106 by the configuration management unit 102. In an embodiment of the present invention, the automation subsystem 106 is configured to automatically extract and analyze the inputs provided by the user for application generation, process the received information, generate the manifest file, create docker images and deploy the application to the target environment. Further, the automation subsystem 106 comprises an automation engine 108, a processor 110 and a memory 112.

In various embodiments of the present invention, the automation engine 108 comprises multiple units which work in conjunction with each other for automating the process of application generation and deployment. The various units of the automation engine 108 are operated via the processor 110 specifically programmed to execute instructions stored in the memory 112 for executing respective functionalities of the units of the engine 108 in accordance with various embodiments of the present invention.

In an embodiment of the present invention, the automation engine 108 comprises a code template generation unit 114, a container deployment unit 116, a PaaS manifest file generation unit 118, a PaaS/FaaS deployment unit 120, a docker file generation unit 122, an application building unit 124, an application deployment unit 126, a storage unit 128 and an error detection and rectification unit 136.

The inputs provided by the user for describing application development and deployment requirements, which are communicated to the automation engine 108 by the configuration management unit 102, are received by the code template generation unit 114 of the automation engine 108. The code template generation unit 114 is configured to analyze the inputs provided by the users in order to generate templates or fetch the stored similar pre-defined templates from the storage unit 128. The templates may comprise source code templates, application deployment templates etc. The templates comprises a structural format for an application source code relating to a monolithic application source code or a micro-service application source code, which is to be utilized by the user for developing and associating a specific domain logic with the source code for application development relating to a specific industry or domain. The domain logic relates to the application based entities and their relationships with respect to each other for a particular domain or industry. The code template generation unit 114 is configured to generate or fetch a source code template specific to the computer programming language selected by the user and provided to the configuration management unit 102. Further, the source code template may comprise a basic folder structure which is specific to selected programming language such as, but is not limited to, Java, .Net, Python, Node.js etc. For example, if the programming language for an application is java, then the java application may have folder structures defined separately for spring framework, spring boot applications etc. In another example, if the programming language for an application is .Net, then the .Net application may have folder structures defined separately for ASP.Net, .Net core etc. Further, the code template generation unit 114 is configured to generate or fetch, from the storage unit 128, source code templates which provide capability of binding the newly developed applications with the existing application services, based on the provided folder structure, which are developed by other users and deployed in the application hosting platforms. For example, an organization may have different services relating to different domains, such as, finance, travel, data management, etc. Therefore, if a new application is developed based on the template, then the new applications may be bound with the existing services by providing uniform resource locater (URL) for the existing service, service access credentials etc. In another example, if a user A selects, on the configuration management unit 102, the application development related to Microsoft Azure and further requires to bind certain existing services of Microsoft Azure with the new application and selects the deployment infrastructure as PaaS instead of IaaS and another user B selects, on the configuration management unit 102, the application development related to Pivotal Cloud Foundry (PCF) and further requires to bind certain existing services of PCF with the new developed application and selects the deployment infrastructure as FaaS on Amazon Lambda, then such requirements are configured based on the pre-defined templates provided by the template generation unit 114 with respect to the inputs provided by the user A and user B. Therefore, the application is developed at the user end by associating the domain logic with the source code template. The developed application is stored in the source code control unit 130, which is subsequently fetched by the automation subsystem 106 for deployment in the deployment infrastructure as explained in later part of the specification. Furthermore, the code template generation unit 114 is configured to provide database templates to the user based on the user inputs relating to database connection for the application and data relating to services for binding with the developed applications.

In an embodiment of the present invention, the user may develop a domain logic for the application in different application architectures such as, monolithic or micro-services architecture, based on the source code templates provided by the code template generation unit 114 operating in conjunction with the storage unit 128, as the storage unit 128 is configured with pre-defined source code templates associated with various application development and deployment scenarios. In an exemplary embodiment of the present invention, the source code is automatically generated by the application building unit 124 of the automation engine 108 based on the inputs provided by the user and templates selected relating to application development and deployment via the configuration management unit 102. The inputs are communicated to the application building unit 124 of the automation engine 108 for automatic application source code generation. Further, the dependencies for the applications are fetched from their sources such as, but is not limited to, node package manager (NPM), NuGet etc. Further, the code template generation unit 114 is configured to provide pre-defined buildpack template to the user in order to provide runtime support to the developed application specific to the different application versions. Further, the code template generation unit 114 provides specific buildpack templates which are specific to the computer programming language selected by the user on the configuration management unit 102. Further, code template generation unit 114 provides certain pre-defined buildpack templates which are customizable. The pre-defined buildpacks are stored in the storage unit 128 and are therefore selected by the code template generation unit 114 based on the user inputs. The developed source codes are specific to a file format in accordance with the source code programming language. For example, a JAR file format is utilized for source code developed in Java, a DLL file format is utilized for source code developed in .Net and a package based on the programming language.

Further, the code template generation unit 114 is configured to generate and provide source code templates relating to micro-services application development and deployment based on the users inputs provided via the user interface for the questions on the wizard. The micro-services sample source code is automatically developed by the application building unit 124 of the automation engine 108 utilizing multiple micro-services patterns provided to and selected by the user in a template form. The micro-services patterns may include, but is not limited to, aggregator, proxy, chained, branch, shared data, asynchronous messaging patterns etc. The user may provide the input relating to the micro-services application development, subsequent to which the code template generation unit 114 provides a template specific to the micro-service pattern, which the user may select via the client terminal device (not shown). The selected template for micro-services application development provides a source code structure to the user utilizing which the user may develop domain logic utilizing the source code template specific to the domain or industry of the application. Advantageously, the micro-services templates provide a source code structure to the user which the user may utilize for developing domain logic, thereby minimizing manual effort for developing the complex micro-services application architecture.

In another embodiment of the present invention, the automation subsystem 106 may be invoked by a user (e.g. developer, programmer etc.) connected to the client terminal (not shown) in order to provide inputs relating to an existing application for a particular industry or domain. The user may invoke the automation subsystem 106 for deploying the existing application to a desired application deployment infrastructure or platform such as, but is not limited to, PaaS, FaaS, infrastructure as a service (IaaS) etc. The automation subsystem 106, before deploying the existing application, is configured to invoke the source code control unit 130 for fetching the source code associated with the application from the source code control unit 130 or any other source code control relating to the application provided by the user. The source code control unit 130 may include, but is not limited to, a source code repository such as, GitHub etc. The source code control unit 130 provides source code that may include, but is not limited to, micro-services source codes, monolithic application source codes, service broker source codes etc. The source code control unit 130 is configured to provide the source code in a specific file format such as, but is not limited to, a Zip format etc. The source code is fetched by the automation subsystem 106 from the source code control unit 130 and subsequently analyzed by the application deployment unit 126 of the automation engine 108 for deploying the source code associated with the application to the required deployment infrastructure via the deployment infrastructure unit 132 in the form of micro-services architecture or monolithic application etc.

In an embodiment of the present invention, the PaaS manifest file generation unit 118 of the automation engine 108 is configured to generate a manifest file associated with the application for specified PaaS infrastructures. Manifest file may comprise meta-data relating to the application source code which may include, but is not limited to, file name, version, other files etc. which may be utilized for deploying the application developed utilizing the source code. Further, in order to generate one or more manifest files for the PaaS infrastructure, the user may provide, via the configuration management unit 102, inputs to the automation subsystem 106 relating to the manifest file generation. For example, the user inputs for generating the manifest file may include disk quota, application name, domain, instances, memory, buildpack etc. The inputs provided by the user are transmitted to the PaaS manifest file generation unit 118 by the automation subsystem 106 in order to generate templates for manifest file generation specific to a PaaS infrastructure. In an exemplary embodiment of the present invention, the PaaS manifest file generation unit 118 is configured to provide different templates specific to different PaaS infrastructures. The PaaS infrastructure for which the templates are provided may include, but is not limited to, amazon web services (AWS), Microsoft Azure, Pivotal Cloud Foundry (PCF), Google Cloud Platform, IBM Cloud, Open Shift, etc. The user may select at least one template specific to a particular PaaS infrastructure for generating the manifest file via the configuration management unit 102.

Further, the user via the client terminal (not shown) may provide a specific input related to the deployment option for an application to a particular PaaS infrastructure, which is captured by the configuration management unit 102 and provided to the PaaS/FaaS deployment unit 120. The PaaS/FaaS deployment unit 120 is configured to generate one or more deployment templates based on the inputs provided by the user for deploying applications in one or more PaaS infrastructures. Further, based on the template selected by the user relating to the PaaS infrastructure the PaaS/FaaS deployment unit 120 analyzes and processes the selected template and the previously generated manifest file and accordingly operates in conjunction with the application deployment unit 126 for deploying the application to the desired PaaS infrastructure. In an exemplary embodiment of the present invention, if the input provided by the user relates to deployment of the developed application to a particular PaaS environment such as, PCF, then the user credentials are acquired by the automation engine 108 via the client terminal (not shown) and application is deployed in the particular PaaS infrastructure. For example, the user credentials required for the deployment of the application to PaaS may include details of PCF, URL, user name, password, organization name, deployment space, etc. Further, the user may also select external services from the multiple options relating to the external services which may be associated with the deployed application in the PaaS infrastructure. For example, if an application relates to displaying weather for a particular location, then the user may connect to an external service or a third party service for displaying weather that may have been hosted on another PaaS environment and in order to connect to the external service or a third party service, the user may define such connection in the application source code or connection may be achieved via the configuration management unit 102. Further, the automation engine 108 is configured to update create user provided services (CUPS) and environmental variables in accordance with the selected PaaS infrastructure for connecting to the external services or third party services. For example, if an application is a web application which needs to display a location map, then displaying of the location map is carried out by utilizing an external or a third party map service, such as, Google maps application, Bing application, etc. Therefore, in order to bind the web application hosted in PaaS environment with the location map service, CUPS is utilized, as the location map service may not be available in the PaaS environment. In another exemplary embodiment of the present invention, if the PaaS infrastructure relates to Azure platform to which the application may be deployed, an alternate deployment template is provided to the user. Then, the user may select the provided template, which aids in saving the user credentials in Azure Vault services which are subsequently fetched by the automation engine 108 at the time of deployment of the application.

In an embodiment of the present invention, the automation engine 108 is configured to further generate docker files of the application based on the inputs provided by the user via the configuration management unit 102. The automation engine 108 in order to create the docker file is configured to process the inputs provided by the user relating to the application development. The inputs for docker file generation may include, but are not limited to, the programming language to be utilized for developing the application, deployment platform, source code credentials, source code repository and source path. The inputs provided by the user in the configuration management unit 102 are communicated to the docker file generation unit 122 by the automation engine 108 for analyzing and processing the inputs for docker file generation. Further, based on the user inputs a specific template is selected by the docker file generation unit 122 from multiple pre-defined docker file templates stored in the storage unit 128 for docker file generation. The pre-defined docker file templates may be based on combination of one or more programming languages and operating system (OS) for application deployment in a computing environment, which may include, but are not limited to, Java+Windows OS, .Net+Linux OS, .Net+Windows, Java+Version 8+Linux OS, Java+Version default+Linux OS or a combination thereof. The docker file generation unit 122 is configured to firstly generate docker files and subsequently generate container images based on docker files which may or may not be specific to an operating system (OS). A container image may be representative of a replica or a package comprising the actual source code of the application with all the dependencies required for execution of the source code associated with the application in a particular computing environment. The OS for which the container images are created may include, but is not limited to, Windows Server core, Windows Nano server, Linux, Ubuntu, Fedora, CentOS etc. The container images are generated from the base images. For example, if the base image is targeted to Windows Server core, then an image associated with Windows Server core is built on top of the base image. The generated application source code images are transmitted to the storage unit 128 by the automation engine 108 and thereafter stored in the storage unit 128 for later retrieval for deployment in respective computing environment.

Further, the created container images are fetched from the storage unit 128 and at the time of deployment stage are deployed in the respective deployment infrastructures by the container deployment unit 116 operating in conjunction with application deployment unit 126 based on the deployment templates. The deployment infrastructures may relate to computing environments such as, but are not limited to, Kubernetes cluster, Google Container services, Amazon Elastic Kubernetes services, Azure container service etc. Advantageously, the creation of container images comprising the application source code aids in reducing the efforts of creating the same application with different dependencies repeatedly for deployment in different computing environments.

In an embodiment of the present invention, the user may communicate inputs via the client terminal (not shown) to the configuration management unit 102 and select development and deployment infrastructure platform as FaaS for development and deployment of a function source code associated with the application. The configuration management unit 102 communicates the user's input to the code template generation unit 114 of the automation engine 108. The code template generation unit 114 is configured to provide a source code template to the user for developing the application source code as a function source code associated with the application. The user may utilize the source code template for developing the domain logic for the FaaS platform and provide the developed source code to the configuration management unit 102 via the user interface. The application building unit 124 is configured to automatically fetch the source code with developed domain logic from the configuration management unit 102. The application building unit 124 is configured to communicate the developed function source code to the Paas/FaaS deployment unit 120. The Paas/FaaS deployment unit 120 analyzes and processes the function source code for deploying the application to the desired FaaS infrastructure. The FaaS infrastructure to which the developed application associated with the developed source code is deployed includes, but is not limited to, AWS Lambda, Azure function and Google functions.

In another embodiment of the present invention, the function source code may be fetched from one or more function source codes stored in the source code control unit 130 for deployment by the Paas/FaaS deployment unit 120 of the automation engine 108. The source code control unit 130 operating as a source code repository such as, but is not limited to, GitHub, Bitbucket etc. is configured to provide the function source code which may be subsequently deployed by the Paas/FaaS deployment unit 120 to a cloud function platform such as, but is not limited to, google cloud functions platform.

In an exemplary embodiment of the present invention, the end-to-end application testing, security check, code coverage, application development success or failure notifications, management for the developed applications is automatically carried out by the application deployment unit 126.

In an embodiment of the present invention, the application catalogue repository 104 is configured to operate in conjunction with the automation subsystem 106. The application catalogue repository 104 is further configured to store the images of the applications provided by the automation subsystem 106. The application catalogue repository 104 may operate at a location local or remote to the automation subsystem 106.

In another embodiment of the present invention, the client terminal (not shown) may be configured to communicate with the application catalogue repository 104 in order to fetch the stored application source code images. The selected stored developed applications or the application source code images are forwarded to the automation engine 108 by the application catalogue repository 104. The automation engine 108 is configured to communicate the stored developed applications or the application source code images to the application deployment unit 126 in order to deploy the selected and stored developed applications or the application source code images associated with the application to a pre-defined application deployment infrastructure via the deployment infrastructure unit 132. The selected and stored developed applications and the application images associated with the application source code are deployed by the application deployment unit 126 operating in conjunction with the application building unit 124 in the appropriate deployment infrastructure based on the inputs provided by the user related to the selection of deployment templates in the configuration management unit 102. Further, the application deployment unit 126 of the automation engine 108 is configured to analyze various application deployment templates selected by the users based on the pre-defined deployment templates in order to deploy the application and application image in a pre-defined deployment infrastructure. For example, the application deployment unit 126 may analyze the template selected by user related to application deployment for suggesting the application deployment in PCF or if application is .Net based, then suggesting deployment of the application in Azure PaaS environment or if the application has various small functions associated with it, then suggesting application deployment in FaaS infrastructure etc. The pre-defined deployment infrastructure may include, but is not limited to, a private cloud and a private/public cloud.

Further, in an embodiment of the present invention, the automation subsystem 106 is configured to deploy the developed applications, the developed source codes and the application images via the application deployment unit 126 to the deployment infrastructure unit 132 in respective infrastructures such as, private cloud, private/public cloud etc. The deployment infrastructure unit 132 may include, but is not limited to, Docker, Kubernetes etc. The private cloud provides capabilities of delivering, downloading and utilizing the developed applications and the source code associated with the application specifically for an organization. For example, an application or source code relating to a voice bot may be utilized and customized by a retail organization or an insurance organization according to the specific needs and requirements. The application, application images or application source code developed and deployed by one organization a particular domain may be reused or configured by another organization of another domain with minimum customization requirement. For instance, an application related to voice bot is developed for a retail organization which may be utilized for finding coupons on various items in the store, offers on various items in the store etc. Further, the same application may be utilized with minimum customization for a banking organization which may be utilized to find a near by automated teller machine (ATM), filling a bank form for a physically challenged person etc. In an exemplary embodiment of the present invention, the private/public cloud provides capability of delivering, downloading and utilizing the developed applications, application images and the source codes associated with the application by various consumers. In another exemplary embodiment of the present invention, the consumer applications and systems may interact with developed applications, application images or source codes deployed related to the same domain. For example, consumer applications such as, but are not limited to, Google voice bot, Alexa, payment gateways etc. may be integrated with the deployment infrastructure unit 132 for interacting the consumer applications and systems with developed applications or source codes.

In an embodiment of the present invention, the application accessing unit 134 is configured to interact with the deployment infrastructure unit 132. The application accessing unit 134 may relate to one or more end user devices or services that may access the applications, application images or application source codes deployed in the deployment infrastructure unit 132. The end user devices and services may connect to the deployment infrastructure unit 132 via an application programming interface (API). The one or more end-user devices may include, but is not limited to, computer systems, smart phones, tablets, voice bots etc. The one or more services may include, but is not limited to, Google voice API which may be utilized by Google voice bots, fraud assessment tool may be utilized for authentication services and customer validation services, tensor flow which may be utilized for artificial intelligence (AI), secure payment gateway which may utilize block chain with separate tokens, Alexa API which may be utilized for voice bots.

In an embodiment of the present invention, the error detection and rectification unit 136 is configured to detect and analyze the error scenarios, after the application development and deployment, which may occur at the time of application development and application deployment. The error detection and rectification unit 136 has built-in-intelligent mechanism for analyzing the error scenarios, learning the error scenarios and patterns and provide self-healing and troubleshooting capability. The error detection and rectification unit 136 utilizes machine learning and artificial intelligence based techniques for processing the error scenarios occurring in the automation engine 108. The error detection and rectification unit 136 is configured to train and generate pre-defined training models with multiple error scenarios and their rectification or resolution conditions. The error detection and rectification unit 136 is capable of updating the pre-defined training models with error scenarios which may occur from time to time. The pre-defined training models based on the training with multiple error scenarios and their resolution scenarios are capable of providing the self-healing and troubleshooting capability to the automation engine 108 by resolving the errors in real-time. For instance, if an error occurs during the deployment of a web application or an application source code image due to non-availability of a port, as it may have been assigned to another application, then pre-defined training models performs a check to determine another port which is available to deploy the web application or an application source code image. Further, the detected error and its resolution is stored in the storage unit 128 and whenever similar error occurs with another web application or an application source code image, the stored resolution is fetched from the storage unit 128 and provided to the error detection and rectification unit 136 in order to assign another port automatically and the application deployment is not put on hold and therefore, self-healing is carried out.

Advantageously, in accordance with various embodiments of the present invention, the system 100 is capable of automatically developing, deploying and managing multiple applications. The system 100 provides applications which are highly scalable, secure and adaptable to new technologies with reusable capability. The system 100 is a customizable application development framework and provides capability of using developed applications by other users as per the user requirements. The system 100 provides built-in capability of learning the error scenarios for self-healing and troubleshooting which aids in reducing downtime and human intervention for error resolution. Further, the micro-services developed utilizing the system 100 are capable of handling large volumes of user requests. Furthermore, system 100 provides development and deployment which are not restricted to a particular application hosting and support infrastructures and thereby reducing costs.

Figure 2:
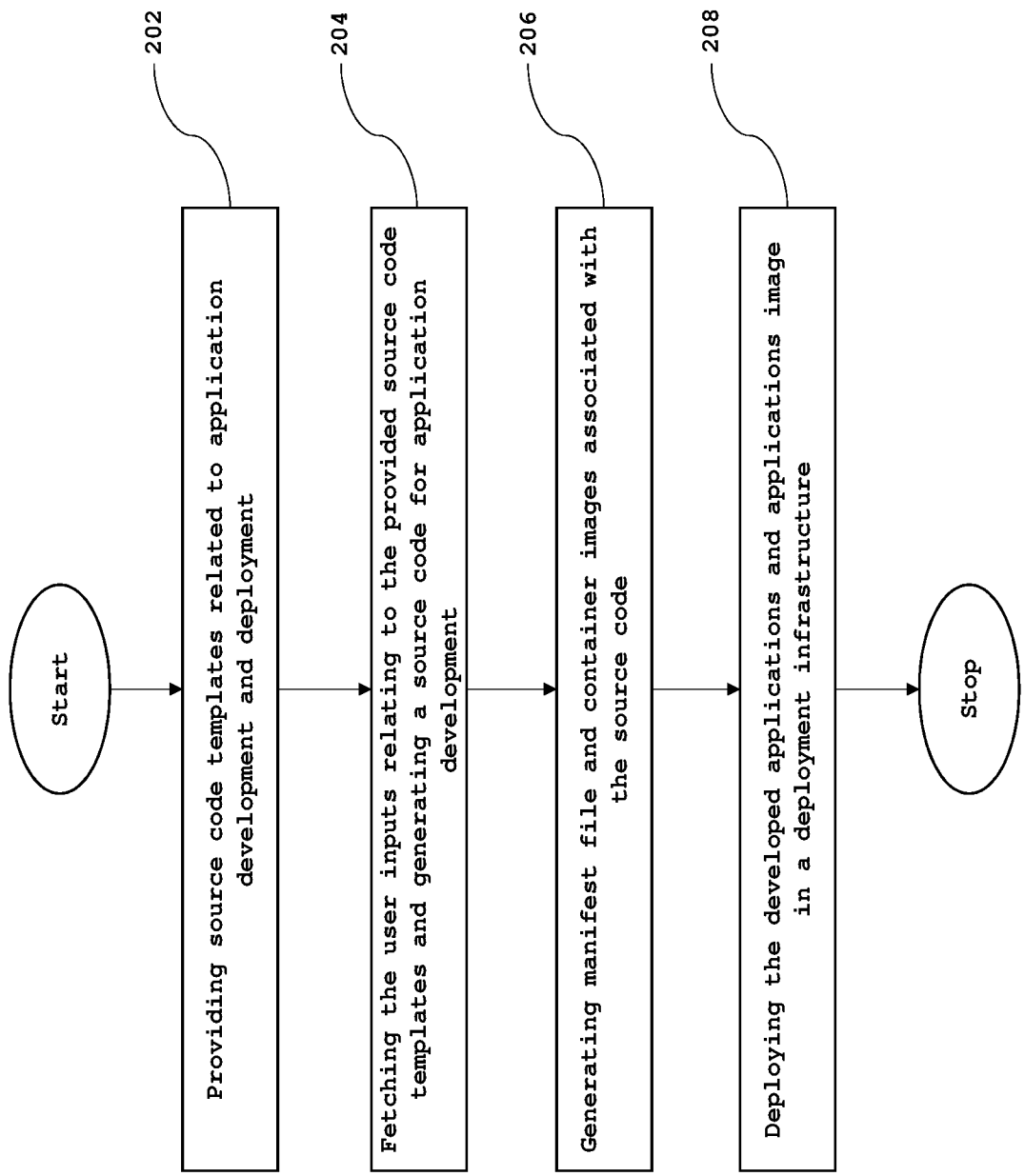
FIG. 2 is a flowchart illustrating a method for automating application development and deployment, in accordance with various embodiments of the present invention.

FIG. 2 is a flowchart illustrating a method for automating application development and deployment, in accordance with various embodiments of the present invention.

At step 202, source code templates are provided relating to application development and deployment. In an embodiment of the present invention, an interface via the client terminals (not shown) is provided for selecting and carrying out the respective functionalities for development and deployment of applications. The interface may include, but is not limited to, graphical user interface (GUI), a JavaScript Object Notation (JSON) interface etc. in a wizard form through which multiple options in the form of questions are provided to the users for acquiring application generation and deployment information. The interface is accessed by the user at the client terminal (not shown) end. The user accessing the interface may have different application development and deployment requirements such as, but are not limited to, a new application development and deployment, deployment of an existing application etc. Further, different requirements may be associated with the application which is to be developed and deployed. The different requirements may include, but are not limited to, domain or industry to which the application may relate, deployment infrastructure platforms (e.g. PaaS, FaaS, etc.), computer programming language for developing the application source code, building application utilizing micro-service architecture, features required in the application, application development specific to a server operating system (e.g. Windows Server, Windows Nano Server, Linux, Ubuntu, Fedora, CentOS) etc.

In an embodiment of the present invention, the user (e.g. developer, programmer etc.) connected to the client terminal (not shown) may provide inputs which are utilized for developing and generating one or more applications source code and applications and deploying the developed and generated applications. Multiple application source code and application development and deployment options are provided via the interface in the form of a wizard comprising questions, to which the user may provide inputs. Further, the user inputs are representative of the computing application source code and application generation requirements based on the development and deployment options. The application source code and application generation requirements may include, but are not limited to, application source code repository and source path, application source code credentials, selecting deployment architecture option, target deployment environment (e.g. Microsoft Azure, amazon web services (AWS), Pivotal Cloud Foundry (PCF) etc.), docker requirement, application database details, application implementation details (e.g. on-premises, software as a service (SaaS) etc.), details of the dependent applications, dependent applications to bind, access credentials for exporting application data, code coverage, end-to-end testing of applications, application security scanning options etc. For example, a user in order to develop an application relating to banking and finance service (BFS) may select the programming language for source code generation (e.g. Java, C++, C, Python etc.), select option for micro-services architecture requirement or a general monolithic application architecture, selection option for providing services which are to be associated with the source code, selecting option for binding existing application services with new application services, selecting the target deployment environment.

In an embodiment of the present invention, the inputs provided by the user are automatically extracted and analyzed for application generation, process the received information, generate the manifest file, create docker images and deploy the application to the target environment.

The inputs provided by the users are analyzed in order to generate templates or fetch the stored similar templates from the storage unit. The templates may comprise source code templates, application deployment templates etc. The templates comprises a structural format for an application source code relating to a monolithic application source code or a micro-service application source code, which is to be utilized by the user for developing and associating a specific domain logic with the source code for application development relating to a specific industry or domain. The domain logic relates to the application based entities and their relationships with respect to each other for a particular domain or industry. A source code template is generated or fetched specific to the computer programming language selected by the user. Further, the source code template may comprise a basic folder structure, which is specific to selected programming language such as, but is not limited to, Java, .Net, Python, Node.js etc. For example, if the programming language for an application is java, then the java application may have folder structures defined separately for spring framework, spring boot applications etc. In another example, if the programming language for an application is .Net, then the .Net application may have folder structures defined separately for ASP.Net, .Net core etc. Source code templates are generated or fetched which provide capability of binding the new developed applications with the existing application services, based on the provided folder structure, which are developed by other users and deployed in the application hosting platforms. For example, an organization may have different services relating to different domains, such as, finance, travel, data management, etc. Therefore, if a new application is developed based on the template, then the new applications may be bound with the existing services by providing uniform resource locater (URL) for the existing service, service access credentials etc. In another example, if a user A selects the application development related to Microsoft Azure and further requires to bind certain existing services of Microsoft Azure with the new application and selects the deployment infrastructure as PaaS instead of IaaS and another user B selects the application development related to Pivotal Cloud Foundry (PCF) and further requires to bind certain existing services of PCF with the new application and selects the deployment infrastructure as FaaS on Amazon Lambda, then such requirements are configured based on the pre-defined templates with respect to the inputs provided by the user A and user B. Therefore, the application is developed at the user end by associating the domain logic with the source code template. The developed application is stored, which is subsequently fetched for deployment in the deployment infrastructure as explained in later part of the specification. Furthermore, database templates are provided to the user based on the user inputs relating to database connection for the application and data relating to services for binding with the developed applications.

In an embodiment of the present invention, the user may provide inputs and select development and deployment infrastructure platform as FaaS for development and deployment of a function source code associated with the application provided via the client terminal (not shown). A source code template is provided to the user for developing the application source code as a function source code associated with the application. The user may utilize the source code template for developing the domain logic for the FaaS platform. The developed domain logic is automatically fetched and the function source code is developed based on the domain logic provided by the user utilizing the function source code template. The function source code is analyzed and processed for deploying the application to the FaaS infrastructure. The FaaS infrastructure to which the developed application associated with the developed source code is deployed includes, but is not limited to, AWS Lambda, Azure function, Google functions or etc.

In another embodiment of the present invention, the function source code may be fetched from an external source code repository for deployment. The external source code repository may include, but is not limited to, GitHub, Bitbucket etc. The source code repository is configured to provide the function source code which may be subsequently deployed to a cloud function platform such as, but is not limited to, google cloud functions platform.

At step 204, the user inputs relating to the provided source code templates are fetched and a source code is generated for application development. In an embodiment of the present invention, the user may develop a domain logic for the application in different application architectures such as, monolithic or micro-services architecture, based on the source code templates provided. In an exemplary embodiment of the present invention, the source code is automatically generated based on the pre-defined templates selected and the inputs provided by the user relating to application development and deployment. The inputs utilized for automatic application source code generation. Further, the dependencies for the applications are fetched from their sources such as, but are not limited to, node package manager (NPM), NuGet etc. Further, pre-defined buildpack template is provided to the user in order to provide runtime support to the developed application specific to the different application versions. Further, specific buildpack templates are provided which are specific to the computer programming language selected by the user. Further, certain pre-defined buildpack templates are provided which are customizable. The pre-defined buildpacks are stored in the storage unit and are therefore selected based on the user inputs. The developed source codes are specific to a file format in accordance with the source code programming language. For example, a JAR file format is utilized for source code developed in Java, a DLL file format is utilized for source code developed in .Net and a package based on the programming language.

Further, source code templates relating to micro-services application development and deployment are generated and provided at step 202 based on the users input provided via the user interface for the questions on the wizard. The micro-services sample source code is automatically developed utilizing multiple micro-services patterns provided to and selected by the user in a template form. The micro-services patterns may include, but is not limited to, aggregator, proxy, chained, branch, shared data, asynchronous messaging patterns etc. The user may provide the input relating to the micro-services application development, subsequent to which a template specific to the micro-service pattern is provided which the user may select via the client terminal device (not shown). The selected template for micro-services application development provides a source code structure to the user utilizing which the user may develop domain logic utilizing the source code template specific to the domain or industry of the application.

In another embodiment of the present invention, a user (e.g. developer, programmer etc.) connected to the client terminal (not shown) may provide inputs relating to an existing application for a particular industry or domain. The user may provide inputs for deploying the existing application to a desired application deployment infrastructure or platform such as, but is not limited to, PaaS, FaaS, infrastructure as a service (IaaS) etc. Prior to the deployment of existing application, the source code or any other source code input is fetched relating to the application provided by the user. The source code associated with the application may be fetched from external source code repositories, which may include, but is not limited to, GitHub etc. The external source code repositories may provide source code that may include, but are not limited to, micro-services source codes, monolithic application source codes, service broker source codes etc. The source code is provided in a specific file format such as, but is not limited to, a Zip format etc. The source code fetched and subsequently analyzed for deploying the application to the required deployment infrastructure in the required form of micro-services architecture or monolithic application etc.

At step 206, manifest file and container images associated with the source code is generated. In an embodiment of the present invention, a manifest file associated with the application for specified PaaS infrastructures is generated. Manifest file may comprise meta-data relating to the application source code which may include, but is not limited to, file name, version, other files etc. which may be utilized for deploying the application developed utilizing the source code. Further, in order to generate one or more manifest files for the PaaS infrastructure, the user may provide inputs relating to the manifest file generation. For example, the user inputs for generating the manifest file may include disk quota, application name, domain, instances, memory, buildpack etc. Templates are generated for manifest file generation specific to a PaaS infrastructure. In an exemplary embodiment of the present invention, different templates specific to different PaaS infrastructures are provided. The PaaS infrastructure for which the templates are provided may include, but is not limited to, amazon web services (AWS), Microsoft Azure, Pivotal Cloud Foundry (PCF), Google Cloud Platform, IBM Cloud, Open Shift etc. The user may select at least one template specific to a particular PaaS infrastructure for generating the manifest file.

Further, the user may provide a specific input related to the deployment option for an application to a particular PaaS infrastructure. One or more deployment templates are generated based on the inputs provided by the user for deploying applications in one or more PaaS infrastructures. Further, based on the template selected by the user relating to the PaaS infrastructure, the selected template and the previously generated manifest file is analyzed and processed and accordingly the application is deployed in the desired PaaS infrastructure. In an exemplary embodiment of the present invention, if the input provided by the user relates to deployment of the developed application to a particular PaaS environment such as, PCF, then the user credentials are acquired via the client terminal (not shown) and application is deployed in the particular PaaS infrastructure. For example, the user credentials required for the deployment of the application to PaaS may include details of PCF, URL, user name, password, organization name, deployment space, etc. Further, the user may also select external services from the multiple options relating to the external services which may be associated with the deployed application in the PaaS infrastructure. For example, if an application relates to displaying weather for a particular location, then the user may connect to an external service or a third party service that may have been hosted on another PaaS environment and in order to connect to the external service or a third party service, the user may define such connection in the application source code or connection may be achieved via the configuration management unit. Further, create user provided services (CUPS) and environmental variables are updated in accordance with the selected PaaS infrastructure for connecting to the external services or third party services. For example, if an application is a web application which needs to display a location map, then displaying of the location map is carried out by utilizing an external or a third party map service, such as, Google maps application, Bing application, etc. Therefore, in order to bind the web application hosted in PaaS environment with the location map service, CUPS is utilized, as the location map service may not be available in the PaaS environment. In another exemplary embodiment of the present invention, if the PaaS infrastructure relates to Azure platform to which the application may be deployed, an alternate deployment template is provided to the user. Then, the user may select the provided template, which aids in saving the user credentials in Azure Vault services which are subsequently fetched at the time of deployment of the application.

In an embodiment of the present invention, docker files of the application are generated based on the inputs provided by the user. The docker file is created based on the inputs provided by the user relating to the application development. The inputs for docker file generation may include, but are not limited to, the programming language to be utilized for developing the application, deployment platform, source code credentials, source code repository and source path. The inputs provided by the user are analyzed and processed for docker file generation. Further, based on the user inputs a specific template is selected from multiple pre-defined docker file templates stored in the storage unit for docker file generation. The pre-defined docker file templates may be based on combination of one or more programming languages and operating system (OS) for application deployment in a computing environment, which may include, but are not limited to, Java+Windows OS, .Net+Linux OS, .Net+Windows, Java+Version 8+Linux OS, Java+Version default+Linux OS or a combination thereof. Firstly, docker files are generated and subsequently container images are generated based on docker files which may or may not be specific to an operating system (OS). A container image may be representative of a replica or a package comprising the actual source code of the application with all the dependencies required for execution of the source code associated with the application in a particular computing environment. The OS for which the container images are created may include, but is not limited to, Windows Server core, Windows Nano server, Linux, Ubuntu, Fedora, CentOS etc. The container images are generated from the base images. For example, if the base image is targeted to Windows Server core, then an image associated with Windows Server core is built on top of the base image. The generated application source code images are transmitted to the storage unit and thereafter stored in the storage unit for later retrieval for deployment in respective computing environment.

Further, the created container images are fetched from the storage unit and at the time of deployment stage are deployed in the respective deployment infrastructures. The deployment infrastructures may relate to computing environments such as, but are not limited to, Kubernetes cluster, Google Container services, Amazon Elastic Kubernetes services, Azure container service etc.

At step 208, developed applications and applications image are deployed in a deployment infrastructure. In an embodiment of the present invention, the deployment of applications is carried out based on a deployment template selected by the user associated with the source code, the manifest file developed and generated in the subsequent steps. Further, an application catalogue repository is configured to store the images of the applications. In an embodiment of the present invention, developed applications are fetched from the stored developed applications or the application source code images. The selected and developed applications and the application source code images associated with the application are deployed to a pre-defined application deployment infrastructure. The selected and stored developed applications and the application images associated with the application source code are deployed in the appropriate deployment infrastructure based on the inputs provided by the user related to the deployment templates. Further, various application deployment templates selected by the users are analyzed based on the pre-defined deployment templates in order to deploy the application and application image in a pre-defined deployment infrastructure. For example, the template selected by user related to application deployment is analyzed for suggesting the application deployment in PCF or if application is .Net based, then suggesting deployment of the application in Azure PaaS environment or if the application has various small functions associated with it, then suggesting application deployment in FaaS infrastructure etc. The pre-defined deployment infrastructure may include, but is not limited to, a private cloud and a private/public cloud.

In an embodiment of the present invention, the developed applications, the developed source codes and the application images are deployed in respective infrastructures such as, private cloud, private/public cloud etc. The deployment infrastructure may include, but is not limited to, Docker, Kubernetes etc. The private cloud provides capabilities of delivering, downloading and utilizing the developed applications and the source code associated with the application specifically for an organization. For example, an application or source code relating to a voice bot may be utilized and customized by a retail organization or an insurance organization according to the specific needs and requirements. The application, application images or application source code developed and deployed by one organization of a particular domain may be reused or configured by another organization of another domain with minimum customization requirement. For instance, an application related to voice bot is developed for a retail organization which may be utilized for finding coupons on various items in the store, offers on various items in the store etc. Further, the same application may be utilized with minimum customization for a banking organization which may be utilized to find a near by automated teller machine (ATM), filling a bank form for a physically challenged person etc. In an exemplary embodiment of the present invention, the private/public cloud provides capability of delivering, downloading and utilizing the developed applications, application images and the source codes associated with the application by various consumers. In another exemplary embodiment of the present invention, the consumer applications and systems may interact with developed applications, application images or source codes deployed related to the same domain. For example, consumer applications such as, but are not limited to, Google voice bot, Alexa, payment gateways etc. may be configured for interacting the consumer applications and systems with developed applications or source codes.

In an embodiment of the present invention, one or more end user devices or services that may access the applications, application images or application source codes deployed in the deployment infrastructure. The end user devices and services may connect to the deployment infrastructure via an application programming interface (API). The one or more end-user devices may include, but is not limited to, computer systems, smart phones, tablets, voice bots etc. The one or more services may include, but is not limited to, Google voice API which may be utilized by Google voice bots, fraud assessment tool may be utilized for authentication services and customer validation services, tensor flow which may be utilized for artificial intelligence (AI), secure payment gateway which may utilize block chain with separate tokens, Alexa API which may be utilized for voice bots.

In an embodiment of the present invention, the error scenarios are detected and analyzed, after the application development and deployment, which may occur at the time of application development and application deployment. Further, built-in-intelligent mechanism is utilized for analyzing the error scenarios, learning the error scenarios and patterns and providing self-healing and troubleshooting capability. Machine learning and artificial intelligence based techniques are utilized for processing the error scenarios. Pre-defined training models are trained and generated with multiple error scenarios and their rectification or resolution conditions. Further, the pre-defined training models are updated with error scenarios which may occur from time to time. Further, pre-defined training models based on the training with multiple error scenarios and their rectification or resolution conditions, the self-healing and troubleshooting capability is provided for resolving the errors in real-time. For instance, if an error occurs during the deployment of a web application or an application source code image due to non-availability of a port, as it may have been assigned to another application, then the pre-defined training models performs a check to determine another port which is available to deploy the web application or an application source code image. Further, the detected error and its resolution is stored in the storage unit and whenever similar error occurs with another web application or an application source code image, the stored resolution is fetched from the storage unit for assigning another port automatically and the application deployment is not put on hold and therefore, self-healing is carried out.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for automating application development and deployment, the system comprising:
    a memory storing program instructions;
    a processor configured to execute instructions stored in the memory; and
    an automation engine executed by the processor and configured to:
        generate a computing application source code associated with a domain based on a source code template;
        fetch a developed computing application, wherein the computing application is developed based on the generated computing application source code;
        deploy the developed computing application in one or more pre-defined deployment infrastructures based on a deployment template; and
        detect one or more errors associated with the deployed computing application and rectify the errors based on pre-defined training models in real-time such that the pre-defined training models perform a check to determine availability of a rectification condition corresponding to the detected error and assign the rectification condition to the deployed computing application, and wherein in the event a similar detected error occurs during deployment of another computing application, the rectification condition is assigned automatically to the another computing application without putting on hold the deployment of the another computing application,
    wherein the system comprises the processor further configured to develop and deploy a function source code associated with the computing application for deploying the computing application to a Function As A Service (FaaS) infrastructure, and further wherein the function source code is fetched from one or more function source codes stored in a source code repository which subsequently deployed by a Platform As A Service (Paas)/FaaS deployment of the automation engine, and
        an application catalogue repository configured to store application source code images and selected stored the application source code images are forwarded to the automation engine by the application catalogue repository.

2. The system as claimed in claim 1, wherein the automation engine executed by the processor and configured to generate the source code template or fetch the source code template from one or more source code templates based on application source code generation requirements.

3. The system as claimed in claim 2, wherein the source code template binds the developed computing application with existing computing application services based on a source code template folder structure.

4. The system as claimed in claim 2, wherein the source code template includes pre-defined customizable buildpack templates for providing runtime support to the developed computing application.

5. The system as claimed in claim 2, wherein the application source code generation requirements comprise application source code repository and source path, application source code credentials, deployment architecture option, target deployment environment, docker requirement, application database details, application implementation details, details of dependent applications, dependent applications to bind, access credentials for exporting application data, code coverage, end-to-end testing of applications and application security scanning options.

6. The system as claimed in claim 1, wherein the pre-defined deployment infrastructures include a private cloud and/or a public cloud.

7. The system as claimed in claim 1, wherein the automation engine executed by the processor and configured to generate a manifest file for deployment of the computing application to one or more PaaS infrastructures based on the pre-defined deployment template, and wherein the pre-defined deployment template is selected from multiple PaaS manifest file deployment templates, and wherein the manifest file comprises meta-data relating to the application source code.

8. The system as claimed in claim 1, wherein the automation engine executed by the processor and configured to generate docker files by selecting a docker file template from multiple pre-defined docker file templates and subsequently generate container images based on the generated docker files, and wherein the pre-defined docker file templates are based on combination of one or more programming languages and operating system (OS).

9. The system as claimed in claim 8, wherein the automation engine executed by the processor and configured to deploy the container images to the pre-defined deployment infrastructures, wherein a container image is representative of a replica or a package comprising actual source code of the computing application with all dependencies required for execution of the actual source code associated with the computing application in different computing environments.

10. A method for automating application development and deployment, wherein the method is implemented by a processor executing instructions stored in a memory, the method comprising:

generating, by the processor, a computing application source code associated with a domain based on a source code template;

fetching, by the processor, a developed computing application, wherein the computing application is developed based on the generated computing application source code;

deploying, by the processor, the developed computing application in one or more pre-defined deployment infrastructures based on a deployment template; and detecting, by the processor, one or more errors associated with the deployed computing application and rectifying the errors based on pre-defined training models in real-time such that the pre-defined training models perform a check to determine availability of a rectification condition corresponding to the detected error and assign the rectification condition to the deployed computing application, and wherein in the event a similar detected error occurs during deployment of another computing application, the rectification condition is assigned automatically to the another computing application without putting on hold the deployment of the another computing application, wherein the method for the automating application development and deployment further comprising:

developing and deploying a function source code associated with the computing application for deploying the computing application to a Function As A Service (FaaS) infrastructure, and further wherein the function source code is fetched from one or more function source codes stored in a source code repository which subsequently deployed by a Platform As A Service (Paas)/FaaS deployment, and storing application source code images in an application catalogue repository and selected stored the application source code images to perform the automating development and deployment by the application catalogue repository.

11. The method as claimed in claim 10, wherein the source code template is generated or the source code template is fetched from one or more source code templates based on application source code generation requirements.

12. The method as claimed in claim 11, wherein the source code template binds the developed computing application with existing computing application services based on a source code template folder structure.

13. The method as claimed in claim 11, the source code template includes pre-defined customizable buildpack templates for providing runtime support to the developed computing application.

14. The method as claimed in claim 11, wherein the application source code generation requirements comprise application source code repository and source path, application source code credentials, deployment architecture option, target deployment environment, docker requirement, application database details, application implementation details, details of dependent applications, dependent applications to bind, access credentials for exporting application data, code coverage, end-to-end testing of applications and application security scanning options.

15. The method as claimed in claim 10, wherein the pre-defined deployment infrastructures include a private cloud and/or a public cloud.

16. The method as claimed in claim 10, wherein a manifest file is generated for application deployment to one or more PaaS infrastructures based on the pre-defined deployment template, and wherein the pre-defined deployment template is selected from multiple PaaS manifest file deployment templates, and wherein the manifest file comprises meta-data relating to the application source code.

17. The method as claimed in claim 10, wherein docker files are generated by selecting a docker file template from multiple pre-defined docker file templates and subsequently generate container images based on the generated docker files, and wherein the pre-defined docker file templates are based on combination of one or more programming languages and operating system (OS), and wherein the container image is representative of a replica or a package comprising actual source code of the computing application with all dependencies required for execution of the actual source code associated with the computing application in different computing environments.

18. A computer program product comprising:

a non-transitory computer-readable medium having computer-readable program code stored thereon, the computer-readable program code comprising instructions, that when executed by a processor to perform automating application development and deployment, cause the processor to:

generate a computing application source code associated with a domain based on a source code template;

fetch a developed computing application, wherein the computing application is developed based on the generated computing application source code;

deploy the developed computing application in one or more pre-defined deployment infrastructures based on a deployment template; and detect one or more errors associated with the deployed computing application and rectify the errors based on pre-defined training models in real-time such that the pre-defined training models perform a check to determine availability of a rectification condition corresponding to the detected error and assign the rectification condition to the deployed computing application, and wherein in the event a similar detected error occurs during deployment of another computing application, the rectification condition is assigned automatically to the another computing application without putting on hold the deployment of the another computing application, wherein the computer-readable program code comprising instructions, that when executed by a processor to perform automating application development and deployment, cause the processor to:

develop and deploy a function source code associated with the computing application for deploying the computing application to a Function As A Service (FaaS) infrastructure, and further wherein the function source code is fetched from one or more function source codes stored in a source code repository which subsequently deployed by a Platform As A Service (Paas)/FaaS deployment, and store application source code images in an application catalogue repository and selected stored the application source code images to perform the automating development and deployment by the application catalogue repository.

* * * * *